(12) United States Patent
Spitzer et al.

(10) Patent No.: US 7,763,698 B2
(45) Date of Patent: *Jul. 27, 2010

(54) COMPOSITION FOR PREVENTING OR REDUCING ALUMINOSILICATE SCALE IN INDUSTRIAL PROCESSES

(75) Inventors: Donald P. Spitzer, Stamford, CT (US); Alan S. Rothenberg, Wilton, CT (US); Howard I. Heitner, Stamford, CT (US); Frank Kula, Danbury, CT (US)

(73) Assignee: Cytec Technology Corp., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/061,755

(22) Filed: Apr. 3, 2008

(65) Prior Publication Data
US 2008/0179564 A1 Jul. 31, 2008

Related U.S. Application Data

(60) Division of application No. 11/197,236, filed on Aug. 4, 2005, now Pat. No. 7,390,415, which is a continuation-in-part of application No. 10/780,302, filed on Feb. 17, 2004, now Pat. No. 7,442,755, which is a division of application No. 10/201,209, filed on Jul. 22, 2002, now Pat. No. 6,814,873, said application No. 11/197,236.

(60) Provisional application No. 60/651,347, filed on Feb. 9, 2005.

(51) Int. Cl.
*C08G 77/14* (2006.01)

(52) U.S. Cl. .................. 528/26; 252/180; 526/279; 528/28

(58) Field of Classification Search .................. 252/180
See application file for complete search history.

(56) References Cited

U.S. PATENT DOCUMENTS

| | | | | |
|---|---|---|---|---|
| 3,408,420 A | * | 10/1968 | Wiggill | 525/102 |
| 3,682,831 A | | 8/1972 | Tate | |
| 3,729,438 A | * | 4/1973 | Plesich et al. | 524/806 |
| 4,010,110 A | | 3/1977 | Cosentino et al. | |
| 4,219,591 A | * | 8/1980 | Buning et al. | 427/387 |
| 4,237,249 A | | 12/1980 | Balzer et al. | |
| 4,344,860 A | | 8/1982 | Plueddemann | |
| 4,564,456 A | | 1/1986 | Homan | |
| 4,612,155 A | * | 9/1986 | Wong et al. | 264/176.1 |
| 4,775,725 A | * | 10/1988 | DePasquale et al. | 525/403 |
| 5,004,791 A | * | 4/1991 | Billmers | 527/300 |
| 5,080,801 A | | 1/1992 | Molter et al. | |
| 5,082,884 A | * | 1/1992 | Filges et al. | 524/188 |
| 5,314,626 A | | 5/1994 | Dimas | |
| 5,409,571 A | | 4/1995 | Togo et al. | |
| 5,415,782 A | | 5/1995 | Dimas | |
| 5,527,431 A | * | 6/1996 | Shetty et al. | 162/164.4 |
| 5,563,184 A | * | 10/1996 | McGee et al. | 523/107 |
| 5,646,210 A | * | 7/1997 | Timmerman et al. | 525/288 |
| 5,679,261 A | * | 10/1997 | Sivakumar et al. | 210/727 |
| 5,733,459 A | | 3/1998 | Rothenberg et al. | |
| 6,086,771 A | | 7/2000 | Selvarajan et al. | |
| 6,109,350 A | * | 8/2000 | Nguyen et al. | 166/281 |
| 6,262,261 B1 | | 7/2001 | Tjioe et al. | |
| 6,814,873 B2 | | 11/2004 | Spitzer et al. | |
| 7,442,755 B2 | * | 10/2008 | Spitzer et al. | 528/26 |
| 2005/0010008 A2 | | 1/2005 | Spitzer et al. | |

FOREIGN PATENT DOCUMENTS

| | | |
|---|---|---|
| JP | 11-090488 | 4/1999 |
| WO | WO 97/41065 | 11/1999 |
| WO | WO 02/070411 | 9/2002 |
| WO | WO 2006/086189 | 8/2006 |

OTHER PUBLICATIONS

V.G. Kazakov, et al., "Heating and Evaporation of Silicon-Coating Aluminate Soluations, " Translated from Tsvetnye Mettally, pp. 45-48 (1979).
S.M. Monhot, "Silicate Copolymers for Silica Scale Inhibition," PPG Industries, Chemical Technical Center, pp. 19-26, (1995).
Andrea R. Gerson and Kali Zheng, "Bayer Process Plant Scale: Transformation of Sodalite to Cancrinite", Jun. 26, 1996, pp. 209-218.
E. Bruce Teas and Jan J. Kotte, "The Effect of Impurities on Process Efficiency and Method for Impurity Control and Removal", Jun. 26, 1980, pp. 100-104.
Database CA "Online"—Chemical Abstracts Servcie, Columbus, Ohio, US; Kazakov, V.G., et al: "Heating and Evaporation of Silicon Containing Aluminate Soluations" (1979) XP002262370 abstract. & Tsvetnye Metally (Moscow, Russian Federation) (1979), (10), 45-8.
Database WPI—Section CH, Week 197709 Derwent Publication Ltd., London, GB: Class A97, An 1977-16031Y XP 002262372 & Su 500 290 A (Alum Magn Electr Ind), May 28, 1976 Extract.
Database CA "Online"—Chemical Abstracts Service, Columbus Ohio, US: Kazakov, V.G. et al: "Improvement in the Evaporation of Soda-Alkaline Aluminate Solutions" (1978) XP 002262371 abstract. & Tsvetnye Metally (Moscow, Russian Federation) (1978), (6), 40-2.
G.A. Smook Handbook for Pulp and paper technologies, 3rd Edition.
P.N. Wannamaker and W.J. Frederick in "Application of solubility data to predicting the accumulation of aluminum and silicon in alkaline pulp mills", Minimum Effluent Mills Symposium, 1996, p. 303.

(Continued)

Primary Examiner—Peter A Hruskoci

(57) ABSTRACT

Materials and a method are provided whereby polymers with least 0.5 mole % of the pendant group or end group containing —Si(OR")3 (where R" is H, an alkyl group, Na, K, or NH4) are used to control aluminosilicate scaling in an industrial process having an alkaline process stream such as a pulping mill process stream. When materials of the present invention are added to the alkaline process stream, they reduce and even completely prevent formation of aluminosilicate scale on equipment surfaces such as evaporator walls and heating surfaces. The present materials are effective at treatment concentrations that make them economically practical.

3 Claims, No Drawings

OTHER PUBLICATIONS

Peterson, R.A. and Pierce, R.A., (2000), Sodium diuranate and sodium aluminosilicate precipitation testing results, WSRC-TR-2000-00156, Westinghouse Savannah River Company, Aiken, SC.

Mattigod, S.V., Hobbs, D.T., Parker, K.E. and McCready, D.E., (2004), Precipitation of scale-forming species during processing of high level wastes, Zachary, T. (Ed). Environmental and waste management: Advancements through the environmental management science program, Symposia of papers presented before the Division of Environmental Chemistrty American Chemical Society. pp. 430-432.

Wilmarth, W.R., Coleman, C.J. Hart, J.C. And Boyce, W.T., (2000), Characterization of Samples from the 242-16H evaporator wall, WSRC-TR-2000-00089, Westinghouse Savannah River Company, Aiken, SC.

Wilmarth, and coworkers (Wilmarth, W.R., Mills, J.T., and Dukes, V.H., (2005), Removal of silicon from high-level waste streams via ferric flocculation, Separation Sci. Technol., 40, 1-11.

W.R. Wilmarth and J.T. Mills "Results of Aluminosilicate Inhibitor Testing", WSRC-TR-2001-00230.

* cited by examiner

COMPOSITION FOR PREVENTING OR REDUCING ALUMINOSILICATE SCALE IN INDUSTRIAL PROCESSES

CROSS-REFERENCE TO RELATED APPLICATIONS

This application is a divisional of U.S. application Ser. No. 11/197,236, filed on Aug. 4, 2005, now U.S. Pat. No. 7,390,415, which is a continuation-in-part of U.S. application Ser. No. 10/780,302, filed Feb. 17, 2004, now U.S. Pat. No. 7,442,755, which is a divisional of U.S. Ser. No. 10/201,209, filed Jul. 22, 2002, now U.S. Pat. No. 6,814,873, and claims benefit of U.S. Provisional Application No. 60/651,347 filed on Feb. 9, 2005, all of which are incorporated by reference in their entireties herein.

SUMMARY OF THE INVENTION

The invention describes materials and methods for preventing or inhibiting the formation of scale on or in equipment used in industrial processes having alkaline process streams.

BACKGROUND OF THE INVENTION

The problem of scaling in and on process equipment used in industrial processes and particularly in those having an alkaline process stream is very well known. The scales present a significant problem when they build up on the surface of process equipment and cause a loss in the heat transfer coefficient. Thus, additional heat may be required to be provided to the evaporator equipment in these processes resulting in added cost.

A an example of such an industrial process having an alkaline process stream is the Kraft recovery process for manufacturing paper which has been known for over 100 years and is eloquently described in many texts on the subject (see G. A. Smook "Handbook for Pulp and paper technologists, 3rd Edition). More recently the development of closed loop cycles in kraft paper mills has resulted in an increase in scaling problems in process equipment due to the build up of aluminum and silicon in the system as is described by P. N. Wannamaker and W. J. Frederick in "Application of solubility data to predicting the accumulation of aluminum and silicon in alkaline pulp mills", Minimum Effluent Mills Symposium, 1996, p303. This article describes the occurrence of aluminosilicate scales in the black, green and white process liquors streams of the Kraft process. When the scales form on the surface of black liquor evaporators, tough glassy scales which are difficult and costly to remove, are formed. It has, therefore, been a well recognized need to provide a method for inhibiting the formation of aluminosilicate scales in kraft pulp mills. U.S. Pat. No. 5,409,571 describes the use of terpolymers of maleic acid acrylic acid and hypophosphorous acid as scale inhibitor for kraft pulp mills. This type of polymer is shown to be effective against calcium carbonate scales but has not been shown to be effective for aluminosilicate scales.

SUMMARY OF THE INVENTION

The present invention solves the aforementioned problems and others by providing materials and a method whereby polymers having at least 0.5 mole % of the group —Si(OR")$_3$ (where R" is H, an alkyl group, Na, K, or NH$_4$) as an end group or pendant thereto are used to reduce or eliminate aluminosilicate scaling in a process having an alkaline process stream such as a kraft pulping mill. When materials of the present invention are added to kraft pulp mill process streams, they reduce and even completely prevent formation of aluminosilicate scale on the equipment surfaces. Moreover, the present materials are effective at treatment concentrations that make them economically practical.

DETAILED DESCRIPTION OF THE INVENTION

The present invention is directed to a method and materials for the reduction of aluminosilicate containing scale in an industrial process having an alkaline process stream such as in the kraft pulp mill process streams. The process stream to be treated can be any process stream having an alkaline condition and in which scaling occurs, e.g. black, green and white liquors of the kraft process.

The method comprises the step of adding to the process stream an aluminosilicate containing scale inhibiting amount of a polymer having at least 5 mole % pendant thereto a group or end group containing —Si (OR")$_3$ where R"=H, C1-C3 alkyl, aryl, Na, K or NH$_4$. The amount of —Si(OR")$_3$ functionality present in the polymer will be an amount sufficient enough to achieve the desired results and can range from a little as 0.5 mole % of the total monomer groups present in the polymer to as much as 100 mole %. However it will be most economical to use the least amount necessary to yield the desired results. The polymers are preferably prepared initially as the silylether derivatives Polymer-Si(OR")$_3$ where R"=C1-C3 alkyl, aryl, eg Polymer —Si(OCH$_2$CH$_3$)$_3$ or Polymer-Si(OCH$_3$)$_3$. The silylether derivatives may be added directly to the industrial process stream such as a kraft pulping mill process stream or they may be hydrolyzed to the silanol derivatives to form polymers of the following generic structures, Polymer-Si(OH)$_3$, Polymer-Si(ONa)$_3$, Polymer-Si(OK)$_3$, and Polymer-Si(ONH$_4$)$_3$ before addition to the process stream. It is a convenient feature of this invention that any of these forms may be added to the process stream. The molecular weight of the polymer should be at least about 500 most preferably at least about 1000.

In a preferred embodiment, the group containing —Si(OR")$_3$, where R"=H, C1-C3 alkyl, aryl, Na, K or NH$_4$ comprises a group according to -G-R—X—R'—Si(OR")$_3$ where G=no group, NH, NR" or O; R=no group, C=O, O, C1-C10 alkyl, or aryl; X=no group, NR, O, NH, amide, urethane, or urea; R'=no group, O, C1-C10 alkyl, or aryl; and R"=H, C1-C3 alkyl, aryl, Na, K or NH$_4$.

In one embodiment, the group is —NH—R—X—R'—Si(OR")$_3$, where R=no group, O, C1-C10 alkyl, or aryl; X=O, NH, an amide, urethane, or urea; R'=no group, O, C1-C10 alkyl, or aryl; and R"=H, C1-C3 alkyl, aryl, Na, K or NH$_4$.

In another embodiment the polymer to which the group is pendant can comprise at least one nitrogen to which the pendant group is attached. Exemplary polymers comprising at least one nitrogen to which the pendant group is attached include, but are not limited to, a polymer according to the following formula:

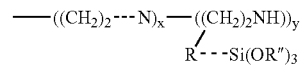

where x=0.1-100%, y=99.9-0%; and R=no group, C1-C10 alkyl, aryl, or —COX—R'—, where X=O or NH and R'=no group, C1-C10 alkyl or aryl; and R"=H, C1-C3 alkyl, aryl, Na, K or NH$_4$; wherein polymers according to the formula:

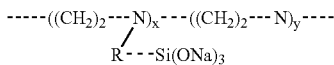

where x=0.5-20%, y=99.5-80% and R=C2-C6 are preferred, and wherein polymers according to the formula:

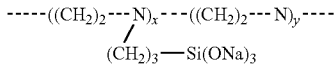

where x=0.5-20%, y=99.5-80% are specific examples.

In another embodiment the polymer having pendant thereto a group or end group containing —Si(OR")$_3$ is derived from an unsaturated polymerizable monomer containing the group —Si(OR")$_3$ where R"=H, C1-C10 alkyl, aryl, Na, K or NH$_4$ and is optionally copolymerized with one or more additional polymerizable monomer(s). Examples of such additional polymerizable monomers include but are not limited to vinylpyrrolidone, (meth)acrylamide, N-substituted acrylamides such as N-alkylacrylamides or acrylamidomethylpropanesulfonic acid, (meth)acrylic acid and salts or esters thereof, maleimides, vinyl acetate, acrylonitrile, and styrene. Particularly preferred unsaturated polymerizable monomers containing —Si(OR")$_3$ groups are monomers of formula V and VI.

Formula V:

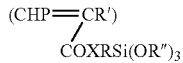

Formula VI:

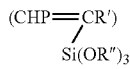

where P=H, C1-C3 alkyl, —CO2R", —CONHR
R=C1-C10 alkyl, aryl,
R'=H, C1-3 alkyl, or aryl
X=O, NH, or NR
R"=H, C1-C3 alkyl, aryl, Na, K or NH$_4$.

Examples of such polymers include homo- and copolymers of trialkoxyvinylsilanes such as CH$_2$=CHSi(OCH$_2$CH$_3$)$_3$ and monomers of the formula VII:

Formula VII:

where P=H, R=—CH$_2$CH$_2$CH$_2$—, R'=H, X=NH and R"=H, C1-C3 alkyl, aryl, Na, K or NH$_4$.

Monomers of this type may be copolymerized with any other polymerizable monomers such as those described above. Particularly preferred copolymerizable monomers include vinylpyrrolidone, (meth)acrylamide, N-substituted (meth)acrylamides, (meth)acrylic acid and it's salts or esters and maleimides. Particularly preferred are N-substituted acrylamides containing 4-20 carbon atoms such as N-methylacrylamide, N,N-dimethylacrylamide, N-ethylacrylamide N-propylacrylamide, N-butylacrylamide, N-amylacrylamide, N-hexylacrylamide, N-penylacrylamide, N-octylacrylamide.

In a preferred embodiment a polymer according to the formula:

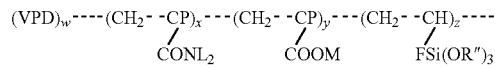

where w=0-99%, x=1-99%, y=1-99%, z=0.5-20% and M=H, Na, K, NH$_4$; and R"=H, C1-10 alkyl, aryl, Na, K or NH$_4$; P=H or CH$_3$, L=H, or C1-C10 alkyl, aryl or aralkyl, F=-G-R—X—R'—Si(OR")$_3$ wherein G=no group, NH, NR" or O; R=no group, C=O, O, C1-C10 alkyl, or aryl; X=no group, NR, O, NH, amide, urethane, or urea; R'=no group, O, C1-C10 alkyl, or aryl; and R"=H, C1-C3 alkyl, aryl, Na, K or NH$_4$ and VPD is a moeity derived from substituted or unsubstituted vinylpyrrolidone monomer. Exemplary polymers are homo- or copolymers of one or more comonomers of formulae VII:

Formula VII:

where P=H, R=—CH$_2$CH$_2$CH$_2$—, R'=H, X=NH and R"=H, C1-C3 alkyl, aryl, Na, K or NH$_4$ wherein polymers according to the following formula:

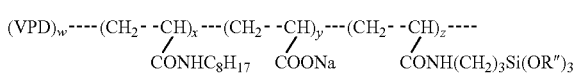

wherein w=0-90%, x=0-50%, Y=0-90%, Z=2-50 mole % are specific examples.

In another embodiment, a polymer according to the formula:

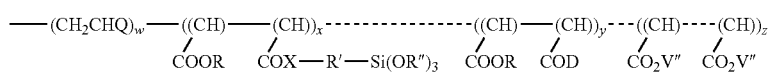

where w=1-99.9%, x=0.1-50%, y=0-50%, z=0-50%; and Q=C1-C10 alkyl, aryl, amide, acrylate, ether, COX'R where X'=O or NH; R=H, Na, K, NH$_4$, C1-C10 alkyl or aryl, or any other substituent; X=NH, NP where P=C1-C3 alkyl or aryl, or O; R'=C1-10 alkyl, or aryl; V"=H, C1-C3 alkyl, aryl, Na, K or NH$_4$ or forms an anhydride ring; R"=H, C1-C3 alkyl, aryl, Na, K or NH$_4$; and D=NR1$_2$ or OR1 wherein R1=H, C1-C20 alkyl, C1-C20 alkenyl or aryl, with the proviso that all R, R", V" and R1 groups do not have to be the same, is used, and wherein polymers according to the formulae:

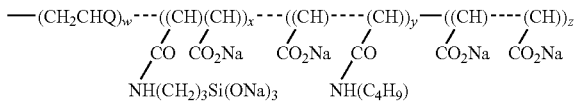

where w=1-99.9%, x=0.1-50%, y=0-50%, z=0-50%; and Q is phenyl, and:

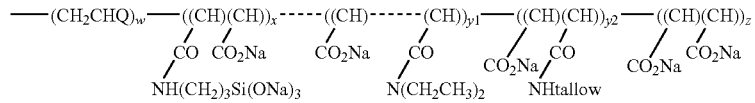

where w=1-99.9%, x=0.1-50%, y1+Y2=0-50%, y1 and y2=0-50% z=0-50%; and Q is phenyl are specific examples.

In another embodiment a polymer according to the formula:

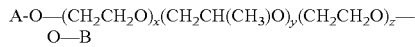

where x=5-100% (as mole %), y and z=0-100% and at least one A and/or B unit is a group containing the group —Si(OR")$_3$, where R"=H, C1-C3 alkyl, aryl, Na, K or NH$_4$ is used. Exemplary such polymers include;

A-O—(CH$_2$CH$_2$O)$_x$(CH$_2$CH(CH$_3$)O)$_y$(CH$_2$CH$_2$O)$_z$—O—B in which A and/or B=R—Si(OR")$_3$, and x=5-50%, y=5-95% and z=0-50% i.e. a copolymer of ethylene oxide and propylene oxide substituted with —Si(OR")$_3$ groups, and A-O—(CH$_2$CH$_2$O)$_x$(CH$_2$CH(CH$_3$)O)$_y$(CH$_2$CH$_2$O)$_z$—O—B in which A and/or B=R—Si(OR")$_3$, x=100%, y=0% and z=0% i.e., a homopolymer of polyethylene oxide substituted with R—Si(OR")$_3$ groups is used.

In another embodiment a polymer prepared from a polysaccharide or polysaccharide derivative is used. Any polysaccharide to which the pendant —Si(OR")$_3$ groups can be attached may be employed. Preferably the polysaccharide should be soluble in the industrial process stream such as a kraft pulping mill process streams liquor. Polysaccharides useful in this invention include but are not limited to cellulose and it's derivatives, such as hydroxyethylcellulose, hydroxypropylcellulose, methylcellulose, hydroxybutylcellulose, carboxymethylcellulose, starch and starch derivatives such as cationic starch, guar, dextran, dextrins, xanthan, agar, carrageenan and the like. Particularly preferred are starch and cellulose derivatives wherein the reaction product of hydroxyethylcellulose with 3-glycidoxypropyltrimethoxysilane is a specific example.

The polymers used in the invention can be made in a variety of ways. For example, they can be made by polymerizing a monomer containing the group —Si(OR")$_3$, where R"=H, C1-C3 alkyl, aryl, Na, K or NH$_4$, such as for example a silane monomer, or copolymerizing such a monomer with one or more co-monomers. Suitable silane monomers for use in the present invention include, but are not limited to vinyltriethoxysilane, vinyltrimethoxysilane, allyltriethoxysilane, butenyltriethoxysilane, gamma-N-acrylamidopropyltriethoxysilane, p-triethoxysilylstyrene, 2-(methyltrimethoxysilyl)acrylic acid, 2-(methyltrimethoxysilyl)-1,4 butadiene, N-triethoxysilylpropyl-maleimide and other reaction products of maleic anhydride and other unsaturated anhydrides with amino compounds containing the —Si(OR")$_3$ group. These monomers can be hydrolyzed by aqueous base, either before or after polymerization. Suitable co-monomers for use in the present invention include, but are not limited to, vinyl acetate, acrylonitrile, styrene, (meth)acrylic acid and its esters or salts, (meth)acrylamide and substituted acrylamides such as acrylamidomethylpropanesulfonic acid, N-methylacrylamide, N,N-dimethylacrylamide, N-ethylacrylamide N-propylacrylamide, N-butylacrylamide, N-amylacrylamide, N-hexylacrylamide, N-phenylacrylamide, N-octylacrylamide. The copolymers can also be graft copolymers such as polyacrylic acid-g-poly(vinyltriethoxysilane) and poly(vinyl acetate-co-crotonic acid)-g-poly(vinyltriethoxysilane). These polymers can be made in a variety of solvents. Solvents suitable for such use include, but are not limited to, acetone, tetrahydrofuran, toluene, xylene, etc. In some cases the polymer is soluble in the reaction solvent and is recovered by stripping off the solvent. Alternatively, if the polymer is not soluble in the reaction solvent, the product is recovered by filtration. Suitable initiators for use in the present invention include, but are not limited to, 2,2'azobis(2,4-dimethylvaleronitrile) and 2,2-azobisisobutyronitrile, benzoyl peroxide, and cumene hydroperoxide.

In another embodiment of the present invention, polymers useful in the invention can be made by reacting a compound containing a —Si(OR")$_3$ group as well as a reactive group that reacts with either a pendant group or backbone atom of an existing polymer. For example, polyamines and polysaccharides can be reacted with a variety of compounds containing —Si(OR")$_3$ groups to give polymers which can be used for the invention. Suitable reactive groups include, but are not limited to an alkyl halide group, such as for example, chloropropyl, bromoethyl, chloromethyl, and bromoundecyl. The compound containing —Si(OR")$_3$, can contain an epoxy functionality such as glycidoxypropyl, 1,2-epoxyamyl, 1,2-epoxydecyl or 3,4-epoxycyclohexylethyl. 3-glycidoxypropyltrimethoxysilane is a particularly preferred compound.

The reactive group can also be a combination of a hydroxyl group and a halide, such as 3-chloro-2-hydroxypropyl. The reactive moiety can also contain an isocyanate group, such as isocyanatopropyl, or isocyanatomethyl that react to form a urea linkage. In addition, silanes containing anhydride groups, such as triethoxysilylpropylsuccinic anhydride are suitable for use in making the polymers for the present invention. The reactions can be carried out either neat or in a suitable solvent. In addition, other functional groups such as alkyl groups can be added by reacting other amino groups or nitrogen atoms on the polymer with alkyl halides, epoxides or isocyanates. The polyamines can be made by a variety of methods. They can be made by a ring opening polymerization of aziridine or similar compounds. They also can be made by condensation reactions of amines such as ammonia, methylamine, dimethylamine, ethylenediamine etc. with reactive compounds such as 1,2-dichloroethane, epichlorohydrin, epibromohydrin and similar compounds.

Polymers containing anhydride groups can be reacted with a variety of compounds containing —Si(OR")$_3$ to make polymers suitable for use in the present invention. Suitable anhydride containing polymers include copolymers of maleic anhydride with ethylenically unsaturated monomers such as styrene, ethylene, alpha olefins such as octadecene, meth (acrylamide), (meth)acrylic acid, acrylate esters such as methyl (meth)acrylate, ethyl (meth)acrylate, butyl acrylate and methylvinylether. The polymer can also be a graft copolymer such as poly(1,4-butadiene)-g-maleic anhydride or polyethylene-g-maleic anhydride and the like. Other suitable anhydride monomers include, but are not limited to, itaconic and citraconic anhydrides. Suitable reactive silane compounds include, but are not limited to γ-aminopropyltriethoxysilane, bis(gamma-triethoxysilylpropyl)amine, N-phenyl-gamma aminopropyltriethoxysilane, p-aminophenyltriethoxysilane, 3-(m-aminophenoxypropyl)-trimethoxysilane, and gamma-aminobutyltriethoxylsilane. Other functional groups can be added to the polymer by reacting it with amines, alcohols and other compounds. In a preferred polymer for use in the present invention, maleic anhydride is the anhydride and the co-monomer is styrene. A preferred silane is gamma-aminopropyltriethoxysilane. It is also advantageous to react some of the anhydride groups with another amine such as diethylamine.

The same type of amino compound containing an —Si(OR")$_3$ group can be reacted with polymers containing a pendant isocyanate group, such as copolymers of for example, isopropenyldimethylbenzylisocyanate and vinyl isocyanate, with co-monomers including, but not limited to, vinyl acetate, styrene, acrylic acid, and acrylamide. These polymers can also be reacted with other compounds such as amines to enhance performance.

Isocyanate functional compounds with an —Si(OR")$_3$ group such as gamma-isocyanatopropyltrimethoxysilane can also be reacted with polymers containing hydroxyl groups such as hydrolyzed poly(vinyl acetate) and copolymers of vinyl acetate with other monomers. Other hydroxyl containing polymers suitable for use include, but are not limited to, polysaccharides and polymers containing N-methylolacrylamide.

In the present process, the amount of polymer added to the process stream can depend on the composition of the industrial process stream (e.g. a Kraft pulping mill process streams liquor involved and generally all that is required is an aluminosilicate containing scale inhibiting amount thereof. In general the polymer is preferably added to the process stream in economically and practically favorable concentrations. A preferred concentration is one that is greater than about 0 ppm to about 300 ppm, more preferably in a concentration that is greater than about 0 ppm to about 50 ppm and most preferably the polymer is added to the process stream in a concentration that is greater than about 0 ppm to about 10 ppm.

The polymer can be added directly to any industrial process stream where scaling can occur, e.g. in the black liquor evaporators of the kraft pulp milling process, and in green and white liquor process streams of that process. It is preferred, however to add the polymer to a charge stream or recycle stream or liquor leading to the black liquor evaporator. While the polymer can be added to the industrial process stream at any time during the process, it is preferable to add it at any convenient point in the process before or during application of heat. Usually, the polymer is added immediately before the evaporator.

EXAMPLES

Preparation of Polymers

Example 1

Polymer 1

10.0 gm of a 1.1:1 styrene/maleic anhydride (MA) copolymer is stirred in 100 ml of toluene under nitrogen. A mixture of 1.72 gm of butylamine (0.50 mole on MA) and 1.66 gm of aminopropyltriethoxylsilane (0.16 mole on MA) in 10 ml of toluene is added, and the mixture is refluxed under nitrogen for 3 hours. The mixture is then cooled and filtered. The solid polymer is washed twice with hexane and dried at 60° C. Aqueous NaOH is then added to the polymer prior to use in order to hydrolyze and neutralize the ethoxysilyl groups. The product is used as an aqueous solution of the sodium salt.

Example 2

Polymer 2

A 1.1:1 styrene/maleic anhydride (MA) copolymer (molecular weight 16,000) is reacted as a dispersion in toluene with tallowamine (0.16 mole ratio on MA), triethoxysilylpropylamine (0.16 mole ratio on MA), and diethylamine (0.68 mole ratio on MA). Aqueous NaOH is then added to the dispersion in order to hydrolyze and neutralize the ethoxysilyl groups. The product is isolated and used as an aqueous solution of the sodium salt. The composition is shown by NMR to be:

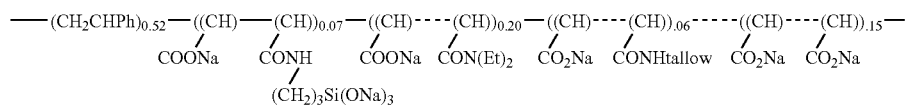

Example 3

Polymer 3

Preparation of the Tetrapolymer of N-Tert-octylacrylamide, acrylic acid, 1-vinyl-2-pyrrolidone, and TESPA (triethoxysilylpropylacrylamide) to give a polymer containing 5 mole % silane containing monomer units is as follows: 1.89 g of 1-Vinyl-2-pyrrolidone, 0.66 g acrylic acid, 2.21 g N-tert-octylacrylamide, 1.30 g TESPA (triethoxysilylpropylacrylamide), (42% in THF), and 0.14 g 2-mercaptoethanol are dissolved in 14 g DMF and 11.64 g dioxane and purged with nitrogen. The mixture is heated to 75° C. and 0.16 g 2,2'-azobis(2,4-dimethylvaleronitrile) in 3 g dioxane is added. After 6 hr at 75° C., the mixture is cooled, giving the desired polymer in solution. The polymer is further purified by precipitation with isopropyl alcohol, washed, and dried. This gives a polymer containing 42.5 mole % 1-vinyl-2-pyrrolidinone, 22.5 mole % acrylic acid, 5 mole % TESPA, and 30 mole % N-tert-octylacrylamide.

Example 4

Polymer 4

Preparation of the copolymer of 1-vinyl-2-pyrrolidone and TESPA (triethoxysilylpropylacrylamide) to give a polymer containing 5 mole % silane containing monomer units is as follows: 4.69 g of 1-Vinyl-2-pyrrolidone, 1.44 g TESPA (42% in THF), and 0.14 g 2-mercaptoethanol are dissolved in 12.5 g DMF and 13.07 g dioxane and purged with nitrogen. The mixture is heated to 75° C. and 0.16 g 2,2'-azobis(2,4-dimethylvaleronitrile) in 3 g dioxane is added. After 6 hr at 75° C., the mixture is cooled, giving the desired polymer in solution with 15% concentration. This gives a polymer containing 95 mole % 1-vinyl-2-pyrrolidinone and 5 mole % TESPA.

Example 5

Polymer 5

Preparation of the Reaction Product of Polyethylene Oxide with 3-glycidoxypropyltrimethoxysilane to give a polymer containing 2.2 mole % silane containing monomer units is as follows: 20.0 g of polyethyleneoxide ($M_n$ about 2000) is dissolved in 10.0 g DMSO and purged with nitrogen. To this mixture is added 2.63 g 3-glycidoxypropyltrimethoxysilane, followed by 1.36 g of 45% KOH. The resulting mixture is heated to 80° C. for 1 hr, giving the desired polymer in solution with 65.8% concentration. This gives a polymer containing about 97.8 mole % ethylene oxide and 2.2 mole % 3-glycidoxypropyltrimethoxysilane.

Example 6

Polymer 6

Preparation of the Reaction Product of Poly(Ethylene glycol)-block-poly(propylene glycol)-block-poly(ethylene glycol) with 3-glycidoxypropyltrimethoxysilane to give a polymer containing 3.1 mole % silane containing monomer units is as follows: 30.0 g of poly(ethylene glycol)-block-poly(propylene glycol)-block-poly(ethylene glycol) (with 50 wt % ethylene oxide and $M_n$ about 1900) is mixed with 4.52 g 3-glycidoxypropyltrimethoxysilane under nitrogen. 2.34 g 45% KOH is added and the resulting mixture heated to 80° C. for 1 hr, giving the desired polymer with 92.6% concentration. This gives a polymer containing about 55.1 mole % ethylene oxide, 41.8 mole % propylene oxide, and 3.1 mole % 3-glycidoxypropyltrimethoxysilane.

Example 7

Polymer 7

Preparation of the Reaction Product of Polyethylenimine with 3-glycidoxypropyltrimethoxysilane is as follows. 81.4 g Polyethylenimine (Lupasol WF (BASF); $M_w$ about 25,000) is mixed with 18.6 g 3-glycidoxypropyltrimethoxysilane, and the resulting mixture is heated at 60° C. for 16 hr, giving the desired polymer as a soft friable gel. The resultant polymer contained 4.0 mole % silane monomer units. For use, the above polymer is dissolved in an aqueous solution of 20 g/l NaOH in order to hydrolyze the trimethoxysilane groups to the sodium salt form.

Example 8

Polymer 8

Preparation of the Reaction Product of Hydroxyethyl cellulose with 3-glycidoxypropyltrimethoxysilane. 8.0 g dry hydroxyethyl cellulose (molecular weight 24,000-27,000) is mixed with 2.0 g 3-glycidoxypropyltrimethoxysilane in 5 g acetone. The acetone is removed by evaporation and the resulting mixture heated at 100° C. for 16 hr, giving the desired polymer containing 15 mole % silane-containing monomer units. For use, the above polymer is dissolved in an aqueous solution of 100 g/l NaOH.

Kraft Pulp Mill Scale Inhibition Testing.

In order to simulate the conditions found in a typical kraft pulp mill black liquor a synthetic process liquor simulating a typical black liquor is prepared in the following way.

A basic aluminate solution is prepared according to the recipe below by adding the aluminate and NaOH solution to the water and stirring overnight. The solution is then filtered through a 3 μm filter membrane (Pall Versapor-3000 T w/wa, 47 mm):

| | |
|---|---|
| $Na_2O \cdot Al_2O_3 \cdot 3H_2O$ | 100.0 g |
| 50% NaOH | 146.6 g |
| Deionized water | 753.4 g |
| Total | 1000.0 g |

This basic aluminate solution is used to prepare a simulated kraft black liquor solution according to the recipe and procedure below. Sodium acetate is added to achieve the desired sodium ion concentration. Amounts are in grams and percentages are w/w unless otherwise indicated.

| | |
|---|---|
| Sodium carbonate | 121.9 |
| Sodium sulfate | 32.7 |
| Sodium thiosulfate | 36.4 |
| Sodium hydrosulfide, 60% | 70.9 |
| Sodium acetate | 445.3 |
| 50% sodium hydroxide | 290.7 |

-continued

| | |
|---|---|
| 29.55% SiO$_2$ | 14.0 |
| Basic aluminate solution | 25.1 |
| Deionized water | 1746 |
| Total | 2783 g = 2.30 liter |

Calculated Concentration:
[CO$_3^{2-}$]=0.5 M
[SO$_4^{2-}$]=0.1 M
[S$_2$O$_3^{2-}$]=0.1 M
[SH$^-$]=0.33 M
[Na$^+$]=5.7 M
[OH$^-$]=1.6 M
[Si]=0.03 M
[Al]=0.01 M The solution is prepared by adding the sodium carbonate, sodium sulfate, sodium thiosulfate, sodium hydrosulfide, and sodium acetate to the water with rapid stirring. After 30 min stirring, the solution is filtered through a coarse glass frit to remove minor amounts of insoluble material. The sodium hydroxide solution, silica solution, and finally basic aluminate solution is added, with stirring after each addition. The solution is used immediately as described below.

Polymer solutions are pre-diluted to 1% (w/w) active concentration in 2% NaOH solution prior to use.

The amount of 1.45 g of a polymer solution, (or 1.45 g of water for the control test), is added to a labeled 4-oz HDPE wide-mouth jar. Then 145 g (120 ml) of simulated kraft black liquor solution is added to each jar before capping and shaking. Each jar then contained a "test solution". The polymer dose is 100 ppm.

The caps on the jars are then loosened so as to be able to relieve pressure, and the jars placed on the floor of a 102° C. oven to simulate heating in a kraft process liquor. After 1.5 hr the caps are tightened and the jars placed on a rotisserie placed inside the oven. After turning on the rotisserie in the oven overnight (16.5 hr), each sample is filtered using a pre-weighed 3-μm filter membrane (Pall Versapor-3000 T w/wa, 47 mm). Each membrane plus any collected solid is washed with about 5-ml water and placed on a 2.5-inch diameter watch glass. A steel tray containing all the watch glasses and membranes is placed in a 102° C. oven for 30 min to dry the filtered solids. Each membrane plus solid is weighed and the weight of the solid calculated by difference. % Scale inhibition is then calculated in the following manner:

$$\text{Scale inhibition} = 100 \times \frac{\text{Weight of scale formed with polymer present}}{\text{Weight of scale formed with polymer absent}}$$

The results of testing polymers of examples 1-8 at 100 ppm are shown in Table 1.

TABLE 1

| Example | Polymer | % scale reduction* |
|---|---|---|
| 9 | 1 | 10.3 |
| 10 | 2 | 27.5 |
| 11 | 3 | 98.0 |
| 12 | 4 | 65.1 |
| 13 | 5 | 96.1 |
| 14 | 6 | 96.5 |
| 15 | 7 | 6.2 |
| 16 | 8 | 28.7 |

*Calculated relative to mean of blank runs using mean of two runs.

What is claimed is:

1. A composition for use in reducing aluminosilicate scale in an alkaline industrial process comprising a polymer according to the formula:

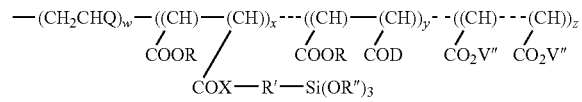

where w=1-99.9%, x=0.1-50%, y=0-50%, z=0-50%; and
Q=C1-C10 alkyl, aryl, amide, acrylate, ether, or COX'R where X'=O or NH;
R=H, Na, K, NH$_4$, C1-C10 alkyl or aryl;
X=NH, NP where P=C1-C3 alkyl or aryl, or O;
R'=C1-10 alkyl, or aryl;
V"=H, C1-C3 alkyl, aryl, Na, K or NH$_4$ or forms an anhydride ring;
R"=H, C1-C3 alkyl, aryl, Na, K or NH$_4$; and
D=NR1$_2$ or OR1 wherein R1=H, C1-C20 alkyl, C1-C20 alkenyl or aryl, with the proviso that all R, R", V" and R1 groups do not have to be the same, wherein said polymer is made by reacting a polymer containing anhydride groups with a compound containing —Si(OR")$_3$.

2. The composition according to claim 1 comprising a polymer selected from the formula

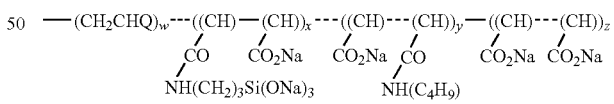

where w=1-99.9%, x=0.1-50%, y=0-50%, z=0-50%; and Q is phenyl,
and the formula

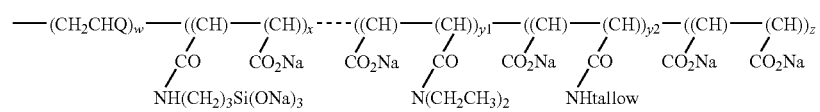

where w=1-99.9%, x=0.1-50%, y1+y2=0-50%, y1 and y2=0-50% z=0-50%; and Q is phenyl.

3. A composition for reducing aluminosilicate scale in an industrial process comprising a polymer which is the reaction product of polyethyleneimine with 3-glycidoxypropyltrimethoxysilane, wherein said polymer has at least 0.5 mole % of the group —Si(OR")$_3$—, and wherein R" is H, an alkyl group, Na, K, or NH$_4$.

* * * * *